March 27, 1951     E. V. BERGSTROM     2,546,625
METHOD AND APPARATUS FOR HYDROCARBON CONVERSION
Filed Dec. 9, 1949     2 Sheets-Sheet 1
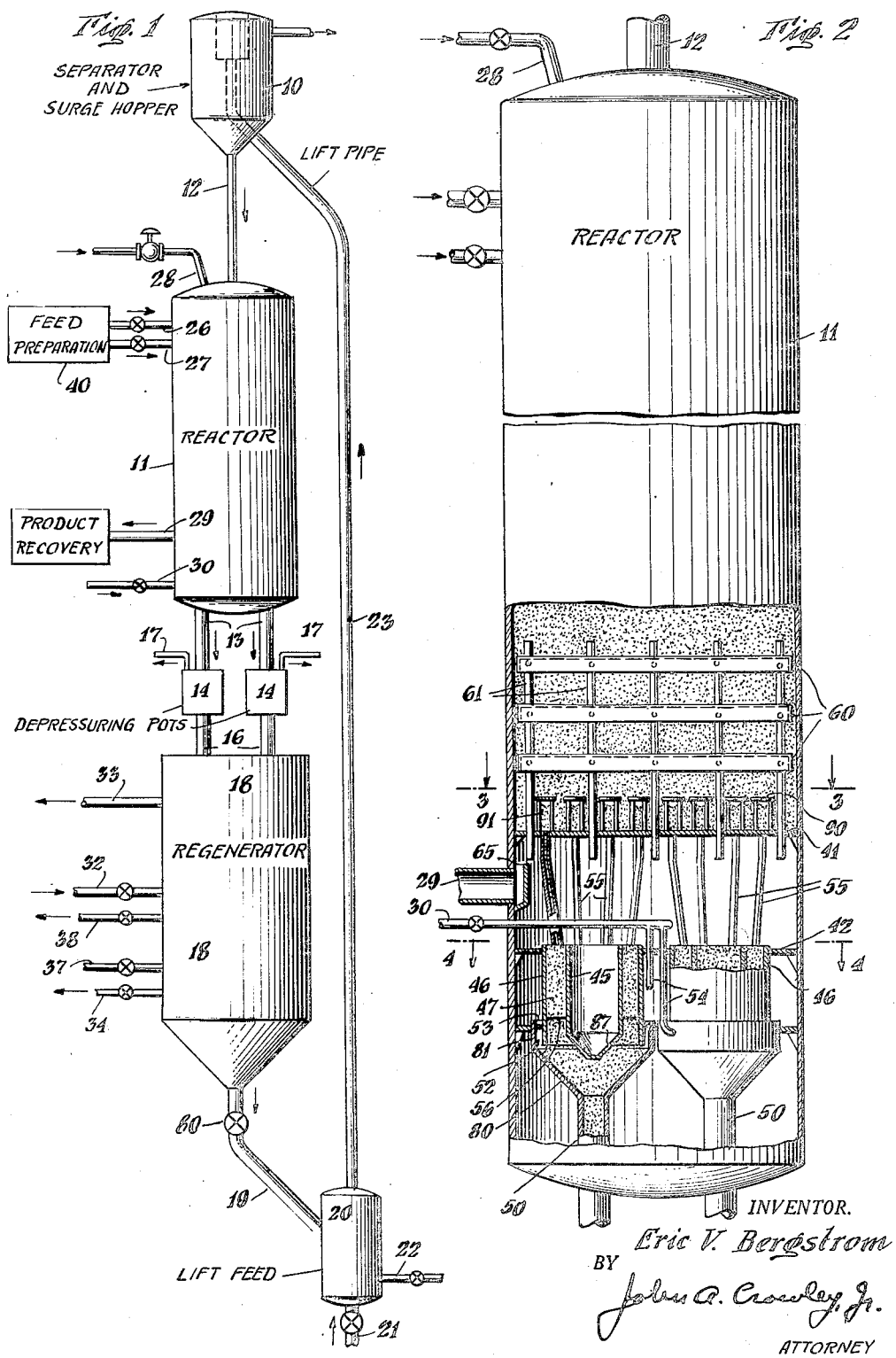
INVENTOR.
Eric V. Bergstrom
BY John A. Crowley, Jr.
ATTORNEY March 27, 1951 E. V. BERGSTROM 2,546,625
METHOD AND APPARATUS FOR HYDROCARBON CONVERSION
Filed Dec. 9, 1949 2 Sheets-Sheet 2
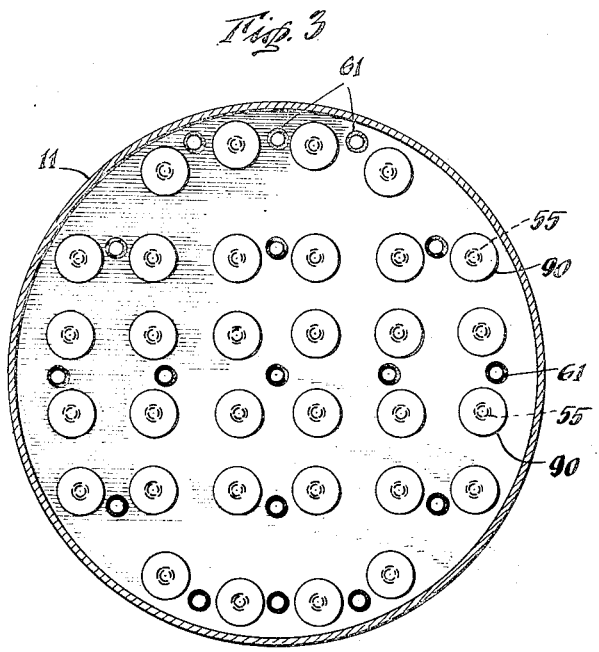
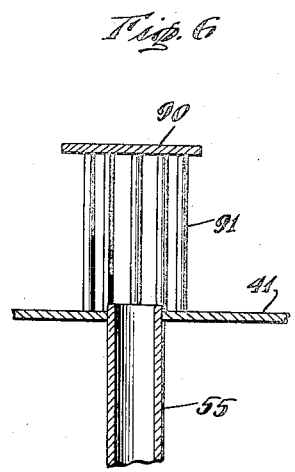
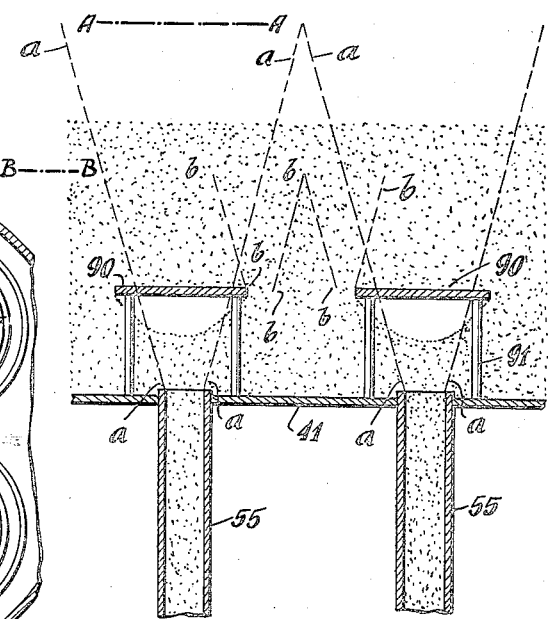
INVENTOR.
Eric V. Bergstrom
BY John A. Crowley, Jr.
ATTORNEY Patented Mar. 27, 1951

2,546,625

UNITED STATES PATENT OFFICE 2,546,625

METHOD AND APPARATUS FOR HYDROCARBON CONVERSION

Eric V. Bergstrom, Short Hills, N. J., assignor to Socony-Vacuum Oil Company, Incorporated, a corporation of New York Application December 9, 1949, Serial No. 132,067

11 Claims. (Cl. 196—52)

This invention relates to a method and apparatus for conversion of fluid hydrocarbons in the presence of a moving granular contact material which may or may not be catalytic in nature. The invention particularly deals with certain improvements in method and apparatus for contact material and gas withdrawal from hydrocarbon conversion vessels.

Exemplary of the processes to which this invention may be applied are the catalytic cracking conversion of high boiling fluid hydrocarbons, the catalytic hydrogenation, dehydrogenation, aromatization, polymerization, alkylation, isomerization, reforming, treating or desulphurizing of selected hydrocarbon fractions. Also exemplary are the thermal cracking, viscosity breaking and coking of hydrocarbon fractions in the presence of heated inert, solid materials.

Typical of such processes is the catalytic cracking conversion of hydrocarbons, it being well known that high boiling fluid hydrocarbons may be converted to lower boiling gaseous, gasoline containing hydrocarbon products by exposure to a suitable adsorbent type catalytic material at temperatures of the order of about 800° F. and higher and at pressures usually above atmospheric. Such a process has been developed commercially into a continuous cyclic process wherein the solid catalyst is passed cyclically through a conversion zone wherein it is contacted with fluid hydrocarbons to effect the conversion thereof and through a regeneration zone wherein it is contacted with a combustion supporting gas such as air which acts to burn off from the catalyst a carbonaceous contaminant deposited thereon in the conversion zone.

This invention is particularly concerned with such cyclic conversion processes or gas-solid contacting processes wherein the particle-form contact material moves through the conversion zone or contacting zone as a substantially compact column and wherein gaseous reaction products or contacting gas and the used contact material are separately withdrawn from the conversion or contacting zone.

In such cyclic processes wherein the contact material is a catalyst it may partake of the nature of natural or treated clays, bauxite, inert carriers upon which catalytic materials such as metallic oxides have been deposited or certain synthetic associations of silica, alumina or silica and alumina to which small amounts of other materials such as metallic oxides may be added for special purposes. In processes wherein the contact material is not catalytic in nature its purpose is usually that of a heat carrier and may take any of a number of forms, for example, spheres or particles of metals, stones or refractory materials such as mullite, zirkite, or corhart material. In order to permit practical rates of gas flow through the contact material which is maintained as a substantially compact column in the conversion zone, the contact material should be made up of particles falling within the size range of about 3 to 100 mesh and preferably 4 to 20 mesh by Tyler Standard Screen analysis.

In the operation of processes involving the flow of contact material through a reaction zone as a substantially compact bed a major problem arises in the maintenance of uniform rates of contact material flow in all portions of the bed. Usually, contact material is withdrawn from the bottom of the bed through an outlet having a cross-section amounting to only a minor fraction of the bed cross-section. Under these conditions the velocity of solid flow will vary widely across the vessel, being greatest in those portions of the vessel cross-section directly above the outlet, unless some means is provided within the lower portion of the vessel to counteract this tendency. Several methods have been proposed heretofore for promoting uniform withdrawal of contact material but these methods involve a number of disadvantages such as the hold up of large amounts of catalyst in baffled zones which are used neither for the hydrocarbon conversion nor catalyst regeneration, the promotion of bumping or catalyst surging in the reactor and failure to properly control uniform catalyst flow when catalyst segregation exists in the reaction bed or when the baffle members in the flow control zone are warped out of alignment. Another problem arising in continuous moving bed systems is that of accomplishing an effective purging of gasiform hydrocarbons from the spent contact material prior to its removal from the reaction vessel. In reactors in which the reactant fluid flows concurrently with the contact material it is necessary to provide also in the lower section of the reactor a means for effecting disengagement of the fluid reactant stream and the contact material so as to permit withdrawal of reactant without entrainment of the granular contact material.

A specific object of this invention is the provision in a system for contacting fluid reactants with a granular contact material of an improved method and apparatus for accomplishing the separation of fluid reactant and contact material, efficient purging of the separated contact material and withdrawal of the purged contact material, while maintaining uniform flow of contact material in all portions of the reaction bed thereabove.

A major object is the provision in a cyclic system for effecting hydrocarbon conversions in the presence of a moving bed of granular contact material of an improved method and apparatus for withdrawing contact material uniformly from all across the bottom of said bed.

Another object is the provision in a system for converting hydrocarbon fluids in the presence of a compact bed of gravitating granular contact material of an intergraded means for purging the used contact material after its withdrawal from the reaction zone and for insuring uniform rates of contact material flow entirely across the reaction bed.

These and other objects of this invention will become apparent from the following description of the invention.

The invention may be most readily understood by reference to the attached drawings of which Figure 1 is an elevational view of a cyclic conversion system of the type to which this invention may be applied. Figure 2 is an elevational view, partially in section, showing the application of this invention to one of the vessels shown in Figure 1. Figure 3 is a sectional plan view taken along line 3—3 of Figure 2. Figure 4 is another sectional plan view taken along line 4—4 of Figure 2. Figure 5 is an enlarged elevational view, partially in section, of a part of the apparatus shown in Figure 2 and Figure 6 is a similar view of a modified form of the structure shown in Figure 5. All of these drawings are highly diagrammatic in form.

Turning now to Figure 1, there is shown a combination separator-surge hopper 10 positioned above a reactor vessel 11 with a gravity feed leg 12 connected therebetween. The reactor which is of circular cross-section as shown but which may be of other shape has four drain legs, one from each quadrant, two of these legs being visible at 13. Each drain leg or conduit connects into a depressuring chamber 14 wherein gaseous pressure is released through vent pipes 17. These depressuring chambers may be of any suitable construction adapted to accomplish reduction of gaseous pressure on the contact material without loss of contact material from the system. Suitable constructions are described in United States Patent 2,446,272, issued August 31, 1948. Conduits 16 connect the bottoms of the depressuring chambers with the top of a regenerator vessel 18 therebelow. A drain conduit 19 leads from the bottom of the regenerator to a lift feed chamber 20. Lift gas inlet conduits 21 and 22 connect into the lift chamber 20 and a lift pipe 23 extends upwardly from a location within the lift chamber to a location within the upper section of vessel 10. The lift system may take any of a number of forms adapted for accomplishing pneumatic transfer of granular contact material. A preferred construction is shown in my application Serial Number 76,017 filed in the United States Patent Office February 12, 1949. If desired, a continuous bucket elevator may be substituted for the pneumatic transfer system. The reactor is provided with gas and liquid charge inlets 26 and 27 respectively near its upper end, a seal gas inlet 28 at its top and a gas outlet 29 from its lower section. A purge gas inlet manifold 30 connects into the vessel below the gas outlet. The regenerator is provided with an air inlet 32 located midway along its length and with flue outlets 33 and 34 located near its ends. Suitable gas distributor and collector devices may be provided within the regenerator in association with the gas inlet and outlet conduits. Heat exchange tubes (not shown) may be provided within the vessel for purpose of temperature control and these tubes may be supplied with a cooling fluid through pipe 37 and the fluid may be withdrawn through pipe 38. It will be understood that the invention is not limited to the particular reactor or regenerator construction described but is applicable to any construction adapted for effecting moving bed solid contacting operations.

In considering the operation, the application of the system shown in Figure 1 to a process for catalytic cracking of petroleum fractions may be taken as typical. A granular adsorbent catalyst of about 4 to 20 mesh particle size for example, flows by gravity into the reactor 11 from gravity feed leg 12 against the pressure therein. An inert seal gas such as steam or flue gas may be introduced into a seal chamber provided in the head of the reactor so as to maintain a seal gas pressure at the base of the feed leg slightly greater than that in the reactor. A vaporized gas oil charge may be supplied from feed preparation system 40 into the upper section of the reactor via conduit 26. If desired, a high boiling liquid charge may be supplied via conduit 27 either in place of or in addition to the vapor charge. Suitable spray nozzles (not shown) may connect with conduit 27 within the reactor. The hydrocarbons pass downwardly through the substantially compact bed of gravitating granular catalyst maintained in the reaction zone at a suitable reaction temperature within the range about 800–1100° F. and under a suitable reaction pressure of about 10 pounds per square inch gauge, for example. The hydrocarbons are converted to gasiform products containing substantial amounts of gasoline and a carbonaceous contaminant is deposited on the catalyst. The gasiform products are disengaged from the spent catalyst and withdrawn separately via conduit 29. The spent catalyst is purged free of gasiform hydrocarbons by means of a suitable inert purge gas such as steam or flue gas which is supplied through conduit 30. The spent catalyst then passes via conduits 13 into depressuring pots 17 where the pressure is reduced substantially to atmospheric pressure or to a pressure near that existing in the regenerator. The catalyst then passes through the regenerator 18 through which it moves as a substantially compact bed while being contacted with air introduced via conduit 32. The carbonaceous deposits are burned from the catalyst and the gaseous combustion products are withdrawn via conduits 33 and 37. The catalyst temperature may be controlled below about 1200° F. by means of indirect heat transfer with a cooling fluid supplied via pipe 37 and withdrawn via pipe 38. The regenerated catalyst passes via conduit 19 to the lift feed tank 20 and is then pneumatically conveyed to the chamber 10 wherein it is separated from the lift gas. The lift gas is withdrawn from the upper section of chamber 10 via pipe 40 and the catalyst returns to the reactor.

Turning now to Figures 2, 3 and 4, which may be best studied together, there is shown in greater detail the internal construction in the lower section of the reactor 11. Two vertically spaced apart, horizontal partitions 41 and 42 are positioned across the lower section of vessel 11 a spaced distance above its bottom so as to define between the partitions a plenum chamber 43. Depending from the lower partition 42 are four spaced sets of passage defining members, each set consisting of two vertical tubes 45 and 46 concentrically arranged so as to define a vertical annular passage 47 which extends on its upper end through the partition 42 and on its lower end to a level therebelow but above the bottom of vessel 11. The inner tube 45 may be closed off by a suitable partition at any level along its length, but preferably it may be closed off at its lower end by the frusto conical member 87. A funnel-shaped drain section is provided below each annular passage. This section is made up of a drain spout 50 located centrally below the annular passage and extending vertically through the bottom of vessel 11, an intermediate frusto-conical section 80 connected on its lower end to the spout and on its upper end to an upper cylindrical section 81. This upper section is of greater diameter than the outer tube 46 forming the annular passage 47 and overlaps the lower end of the tube 46 so as to leave an annular space 52. This space is closed off at its upper end by the member 53. A pipe 54 connects into the drain section at the level of space 52 and connects on its upper end to the purge gas inlet manifold 30. It will be noted from Figure 4 that an annular passage 47 is provided in each of the four quadrants of the circular partition 42. A plurality of spaced holes are provided in the upper partition 41 and a conduit 55 is tightly fitted on its upper end into each hole and extends downwardly below the partition. The conduits from each quadrant of the partition 41 terminate on their lower ends at points spaced around the upper end of one of the annular passages 47. Most of the conduits 55 are not vertical all along their lengths but should in all cases have slopes not less than 45 degrees. A plurality of radial or transverse, vertical baffles 56 are provided at spaced intervals across only the upper portion of each annular passage 47 to divide it into a plurality of vertical sections isolated from each other. These sections 57 all terminate on their lower ends short of the lower end of the annular passage 47. The sections 57 equal the conduits 55 in number so that each conduit 55 delivers contact material to the upper end of a separate section 57. The sections 57 vary in horizontal cross-sectional area directly in proportion to the relative amounts of vessel cross-section controlled by the respective conduits 55 delivering solid material thereto. The amount of vessel cross-section controlled by any conduit 55 is determined by the spacing of the conduits, that is by the density of conduit area provided per unit vessel area. In those areas where the tube spacing on partition 41 is greater, the percentage area of the vessel handled by any conduit 55 is greater, and the rate of solid flow through the conduit should also be greater. Preferably the conduits 55 should be uniformly spaced across the partition 41 and all tubes so spaced will deliver to passages 57 of equal cross-section. However, near the walls of the vessel, the conduit spacing and the area of vessel controlled by any given conduit may vary. These conduits controlling a greater portion of the total vessel area than others deliver into passages 57 which are of proportionately greater area. In the lower section of the reaction zone which is terminated by partition 41, there are provided three vertically spaced rows of horizontally spaced inverted gas collector troughs 60. Tubes 61 extend down through the troughs 60 and through partition 41 to terminate within the plenum chamber 43. These tubes have orifices therein at locations underneath the troughs so as to provide confined passages for gas flow from under the troughs to the plenum chamber 43. It is contemplated that the collector troughs may be located all on one level or that caps may be substituted for the troughs. Gas collecting devices of this type are described in United States Patent 2,458,498, issued January 11, 1949.

In operation the gasiform products formed in the reaction zone are collected under the troughs 60 and passed downwardly through tubes 61 into the plenum chamber 43. In this chamber any entrained particles settle and find their way into one of the annular passages 47 which are open on their upper ends to the plenum chamber. The gaseous products are withdrawn via conduit 29 which communicates the plenum chamber. A baffle 65 may be placed in front of the entrance to outlet 29 to discourage direct flow of gas from the tubes 61 into the outlet 29. Contact material flows from the bottom of the reaction bed through conduits 55 into the four annular passages 47. The contact material forms a substantially compact annular column in each of these passages and the upper portions of each of these annular columns are subdivided into a plurality of isolated sectors by transverse baffles 56. The flow from each conduit 55 is handled in a separate sector 57 and the sectors have their cross sections proportioned in the same manner as are proportioned the areas of the reaction bed from which contact material flows to the confined streams supplying the sectors. The flow from the sectors 57 combines in the lower portion of each annular column 47 below the lower ends of baffles 56. The flow from the bottom of each annular column is caused to symmetrically converge into a single compact discharge stream in a spout 50 which is disposed centrally below an annular column. The rate of contact material flow through the spouts 50 is throttled either by valves on the spouts or as is shown in Figure 1 by the valve 80 at the bottom of regenerator 18 or by other suitable means so that continuity of compactness of contact material stream flow is maintained upwardly from the single streams flowing in spouts 50, through the drain sections and annular passages 46 and through conduits 55 to the reaction bed above partition 41. Under these conditions contact material may flow from the lower ends of any of the sectors 57 only as fast as the contact material flows away from the lower ends of these sectors in the non-partitioned lower portion of the annular passages 47. Uniform flow rates are assured all around this lower portion of the annular passage by symmetrically merging the flow from all around the bottom of the annular passage. As a result, the volumetric rate of flow from the sectors is proportional to their areas of cross section where they flow onto the non-baffled lower portion of the annular passage. Hence, by proportioning the areas of the sectors 57 at least at the level of their lower ends in accordance with the proportion of the vessel cross section controlled by the respective conduits 55 supplying these sectors, it is possible to provide a uniform rate of solid material withdrawal from all portions of the reaction bed cross section even though the conduits 55 are not all equally spaced over the partition 41. In practice, it is sometimes desirable to arrange the conduits connecting through partition 41 on a rectangular pattern where the spacing between adjacent tubes may be unequal. On the other hand, most of the conduits may be equally spaced where they connect to partition 41 except for those near the vessel walls in circular vessels. As a general rule, equally spaced conduits control equal areas of the vessel cross section.

The system described hereinabove provides for uniform flow of catalyst in the reaction bed at all levels above the level of intersection of lines drawn upwardly from the edges of adjacent conduits 55 connecting into partition 41 at angles equal to the angle of internal flow of the contact material. For most applications the angle of internal flow may be assumed to fall within the range 65–80 degrees with the horizontal. Looking at Figure 5, the lines a—a if rotated about any conduit 55 will define the area in the bed from which contact material will flow to that conduit. Level A—A represents the level above which uniform catalyst flow may be expected all across the bed. It is desirable to locate the lowermost gas collecting channel above this level. The distance above the partition 41 of the uniform flow level may be reduced by providing over each opening in partition 41 a circular plate 90. The plate 90 should be of larger diameter than the hole in the partition 41 above which it is placed but sufficiently restricted in diameter to leave a substantial space for contact material flow between plates over adjacent holes. Each plate 90 should be spaced a sufficient distance above the hole so that lines drawn upwardly from the center line of the hole in partition 41 at an angle of 45 degrees or less with the horizontal do not intersect the plate but the plate should be sufficiently near the hole so that lines drawn upwardly from the edge of the hole at the angle of internal flow of the contact material intersect the plate. In general, it is desirable to space the plates 90 sufficiently above each hole in partition 41 so that the solids flowing in under the plate at their angle of repose (generally 30–45 degrees with the horizontal) form a bed at least 6 inches in depth over the hole. When the plates 90 are employed, catalyst will flow under the plates from the area included between the lines b—b representing the angle of internal flow when these lines are rotated around the plate. The level of intersection of these lines from adjacent plates is shown at B—B and above this level, uniform flow in the reaction bed may be expected. The plates 90 may be supported by 3 or 4 rods 91 as shown in Figure 5 or by a number of more closely spaced rods 92 as shown in Figure 2. By closely spacing the rods 92 an effective screen is provided against the flow of any large chunks of foreign material into the tubes 55, thereby avoiding possible plugging of these tubes.

It will be noted that by the invention described herein, the means for providing uniform withdrawal of granular contact material an inert purge gas is supplied by manifold 30 and branch pipe 54 into the annular space 52 surrounding the lower end of each annular column 47. The gas enters the lower end of the annular column and passes upwardly therethrough so as to purge the contact material free of gasiform hydrocarbons. The purge gas and any hydrocarbons so removed from the contact material are withdrawn from plenum chamber 43 along with the gasiform hydrocarbon products. By this arrangement the purge gas is prevented from entering the reaction zone where it would lower the reactant partial pressure.

It will be noted that by the invention described above the means for providing uniform catalyst withdrawal from the reaction bed is intergraded with the means for purging the catalyst free of reactant and with the means for withdrawing hydrocarbon products from the system separately of the catalyst. This has resulted in a very substantial reduction in the overall length of the reactor vessel and in a reduction in its cost as compared with reactors wherein the gas-catalyst separation, catalyst purging and catalyst withdrawal steps are separated. It will be noted that an intergraded system is shown in United States Patent 2,458,498, but the present invention provides several advantages over the system shown in that patent. The present invention permits a substantial reduction in the volume of catalyst hold up in portions of the reactor outside of the reaction zone. The catalyst withdrawal system described herein is less apt to be thrown out of proper operating adjustment by temperature warping of its component parts than the one shown in said patent; and the efficiency of the present catalyst withdrawal system for effecting catalyst withdrawal at a uniform rate from all parts of the vessel cross-section is not seriously effected by segregation of fines or differences in the average particle diameter in various sections of the reaction bed. Also, by elimination of large free surface areas of material beds in the withdrawal system the tendency for catalyst flow surging is eliminated.

It is contemplated that the catalyst withdrawal method and apparatus described hereinabove may be employed also in the regenerator vessel either in conjunction with flue gas withdrawal or separately therefrom. It is further contemplated that in contacting vessels of relatively small diameter only one annular passage and drain passage therebelow may be required to handle the flow from all of the conduits 55, and that more than four annular passages may be required for vessels of very large cross-section.

As an example of satisfactory dimensions for the catalyst withdrawal system described hereinabove, in a circular reactor having a diameter of 16 feet four annular passages are provided, each measuring 5 feet, 8 inches outside diameter and 4 feet, 4 inches inside diameter and 2 feet in length. The upper one foot of each annular passage is divided by radial baffles into 43 sectors. In each quadrant of partition 41 connect 43 eight inch conduits 55, one for each of the sectors in one of the annular passages. The conduits 55 connect to partition 43 in parallel rows 20 inches apart with the conduits in each row spaced on 12 inch centers except near the vessel walls. The vertical sections 57 vary in cross-section depending upon the area controlled by the conduits supplying them. A 12 inch diameter drain spout is centered below each annular passage and connected thereto through a suitable funnel-shaped drain section. The vertical distance between partitions 41 and 42 is about 5 feet, eight inches. This system is adapted to handle a catalyst flow amounting to about 350 tons per hour with a factor of safety of three.

It should be understood that the specific examples of operation, construction and application of this invention given hereinabove are only exemplary in nature and are not intended as limiting the scope of this invention except as it may be limited by the following claims.

I claim:
1. A method for conducting the conversion of hydrocarbons in the presence of a moving granular contact material which comprises: passing the granular contact material downwardly through a confined conversion zone as a substantially compact column of gravitating granules, passing a fluid hydrocarbon charge through said column under suitable reaction conditions to effect its conversion to a lower boiling gasiform hydrocarbon product and withdrawing said product from said conversion zone, passing the contact material downwardly from a plurality of spaced points over the bottom of said column as a plurality of confined substantially compact streams and directing said streams to a plurality of spaced points on the surface of an upright annular shaped column of said contact material, subdividing the upper portion of said column including its surface into a plurality of isolated sectors equal in number to said confined streams, each sector being supplied with material from one of said confined streams and said sectors having their cross sectional areas proportioned in the same manner as are proportioned the areas of the conversion zone column from which contact material flows to the confined streams supplying said sectors, permitting the flow from said sectors to combine in the lower portion of said annular column and symmetrically converging the flow from the bottom of said annular column into a single compact discharge stream disposed centrally below said annular column.

2. In a process wherein a granular contact material is passed downwardly as a substantially compact bed through a confined contacting zone, while being contacted with a fluid material the improved method of withdrawing contact material uniformly from all portions of the cross-section of said bed so as to promote uniform flow of contact material in said bed which comprises: withdrawing contact material from a plurality of spaced locations distributed over the bottom of said bed as a plurality of confined, substantially compact streams, directing said streams to a plurality of locations spaced around the surface of at least one upright laterally confined annular column of gravitating contact material, subdividing the flow in the upper portion of each annular column including its surface into a plurality of isolated sectors, each of said streams supplying material separately to one of said sectors, the cross sectional areas of said sectors being proportional to the areas of said bed from which contact material is withdrawn by the streams supplying the respective sectors, permitting the flow from said sectors to merge in the lower portion of the annular column and symmetrically converging the flow from each annular column into a single substantially compact discharge stream extending downwardly centrally below said annular column.

3. A method for conducting the conversion of hydrocarbons in the presence of a moving granular contact material which comprises: passing the granular contact material downwardly through a confined conversion zone as a substantially compact column of gravitating granules, passing a fluid hydrocarbon charge through said column under suitable reaction conditions to effect its conversion to a lower boiling gasiform hydrocarbon product and withdrawing said product from said conversion zone, passing the contact material downwardly from a plurality of spaced points over the bottom of said column as a plurality of confined substantially compact streams and directing said streams to a plurality of spaced points around the surface of at least one upright annular shaped column of said contact material, the total number of said annular columns being substantially less than the number of streams subdividing the upper portion of each column including its surface into a plurality of isolated sectors equal in number to said confined streams, each sector being supplied with material from said sectors having their cross sectional areas proportioned in the same manner as are proportioned the areas of the conversion zone column from which contact material flows to the confined streams supplying said sectors, permitting the flow from said sectors to combine in the lower portion of the annular column and symmetrically converging the flow from the bottom of each annular column into a single compact discharge stream disposed centrally therebelow, introducing a suitable inert purge gas into the lower section of each annular column and passing it upwardly therethrough to purge said contact material free of gasiform hydrocarbons and withdrawing the purge gas from the upper section of each annular column while excluding its flow from said conversion zone.

4. A method for conversion of fluid hydrocarbons to lower boiling gasiform hydrocarbons in the presence of a moving granular contact material which method comprises: introducing granular contact material into the upper section of a confined elongated conversion zone at a suitable temperature for said hydrocarbon conversion, passing said contact material downwardly through said zone as a substantially compact bed of gravitating granules, introducing fluid hydrocarbons into the upper section of said zone and passing said hydrocarbons downwardly within said bed to effect conversion to lower boiling gasiform hydrocarbons, collecting said gaseous products in a plurality of gas collecting spaces spaced apart within a lower portion of said bed, passing the collected gas as confined streams from said collecting spaces into a confined plenum zone below said column and withdrawing the gasiform products from said plenum zone, withdrawing contact material from a plurality of locations distributed over the bottom of said column as a plurality of confined substantially compact streams in which the contact material flows downwardly through said plenum zone and discharges at a plurality of locations spaced around the surface of at least one upright, laterally confined annular column of contact material which column is open on its surface to the plenum chamber, subdividing the flow in the upper portion of each annular column including its surface into a plurality of isolated sectors each of said streams supplying material separately to one of said sectors, the cross sectional areas of said sectors being proportional to the areas of said bed from which contact material is withdrawn by the streams supplying the respective sectors, permitting the flow from said sectors to merge in the lower portion of the annular column and symmetrically converging the flow from each annular column into a single substantially compact discharge stream extending downward centrally below said annular column.

5. A method for conversion of fluid hydrocarbons to lower boiling gasiform hydrocarbons in the presence of a moving granular contact material which method comprises: introducing granular contact material into the upper section of a confined elongated conversion zone at a suitable temperature for said hydrocarbon conversion, passing said contact material downwardly through said zone as a substantially compact bed of gravitating granules, introducing fluid hydrocarbons into the upper section of said zone and passing said hydrocarbons downwardly within said bed to effect conversion to lower boiling gasiform hydrocarbons, collecting said gaseous products in a plurality of gas collecting spaces spaced apart within a lower portion of said bed, passing the collected gas as confined streams from said collecting spaces into a confined plenum zone below said column and withdrawing the gasiform products from said plenum zone, withdrawing contact material from a plurality of locations distributed over the bottom of said column as a plurality of confined substantially compact streams in which the contact material flows downwardly through said plenum zone and discharges at a plurality of locations spaced around the surface of four upright laterally confined annular columns of contact material which columns are open to said plenum chamber, subdividing the flow in the upper portion of each annular column including its surface into a plurality of isolated sectors, each of said streams supplying material separately to one of said sectors, the cross-sectional areas of said sectors being proportional to the areas of said bed from which contact material is withdrawn by the streams supplying the respective sectors, permitting the flow from said sectors to merge in the lower portion of the annular column and symmetrically converging the flow from each annular column into a single substantially compact discharge stream extending downward centrally below said annular column, introducing a suitable inert purge gas into the lower section of each of said annular columns and passing it upwardly through said columns into said plenum zone to effect purging of gasiform hydrocarbons from the contact material and withdrawing the purge gas from said plenum zone along with the hydrocarbon products.

6. In a gas-solid contacting vessel adapted for confining a substantially compact column of granular solid material therein an improved means for withdrawal of contact material from the bottom of said vessel which comprises: a partition extending across the entire horizontal cross section of said vessel at a level in the lower portion thereof spaced a substantial distance above the lower end of said vessel, members defining a vertical annular-shaped passageway in said vessel a spaced vertical distance below said partition and above the bottom of said vessel, a conical drain funnel positioned at the lower end of said annular passageway adapted to receive the solid flow therefrom, said drain funnel having its spout positioned centrally below the annular passageway and extending through the bottom of said vessel, a plurality of conduits extending downwardly from a plurality of spaced locations on said partition to a plurality of locations spaced around the upper end of said annular passageway, said conduits extending through the partition on their open upper ends, a plurality of vertical, radial baffles across the upper portion only of said annular passageway dividing it into a plurality of vertical sections for solid flow, one section being provided to receive flow from each one of said conduits, said sections varying in horizontal cross-section in proportion to the amount of vessel cross-section controlled by the respective conduits delivering solid material thereto, the amount of vessel cross-section controlled by any conduit being dependent upon the tube spacing and being greater in areas where the tube spacing is greater.

7. A gas-solid contacting apparatus comprising: a vertical chamber having a fluid inlet connected thereinto and a fluid outlet at a level spaced away from said inlet, means to introduce granular contact material to the upper section of said chamber, members defining at least one vertical annular-shaped passageway a spaced vertical distance below the bottom of said chamber, a conical drain funnel connected to the lower end of each annular passageway, said drain funnel having a downwardly extending spout located centrally below the annular passageway, a plurality of spaced holes in said partition, a plurality of conduits, one for each hole, having their open upper ends fitted tightly into said holes and extending downwardly from the bottom of said chamber, said conduits all terminating at locations spaced around the upper section of each annular passageway, there being a substantial number of said conduits for each annular passageway, transverse baffles across the upper portion of each annular passageway and terminating substantially short of the lower end of said passageways, said baffles dividing the upper portion of each annular passageway into a plurality of vertical sections for solid flow, equal in number to said conduits so that only one of said conduits terminates in the upper section of each one of said vertical sections, said sections having their horizontal cross-sections proportioned directly to the relative amounts of vessel cross-section controlled by the respective conduits delivering solid material thereto, the amount of chamber cross-section controlled by any conduit being determined by the density of conduit area provided per unit of chamber area, and being greater in those areas where the density of tube area per unit of chamber area is smaller.

8. An apparatus according to claim 7 characterized by the further improvement of a circular plate positioned above each of said holes in the bottom of said chamber, the plates being of larger diameter than the holes but of sufficiently restricted diameter to leave substantial spaces for solid flow between adjacent plates all of said plates being located at a common level which is more than six inches above the bottom of said chamber.

9. A gas-solid contacting apparatus comprising: a closed vertical vessel, a fluid inlet connected into the upper section of said vessel, a contact material inlet connected into the upper section of said vessel, a horizontal partition positioned across the lower section of said vessel a substantial distance above its lower end, members defining a vertical annular-shaped passageway in said vessel a spaced vertical distance below said partition and above the bottom of said vessel, partitioning extending across the vessel at a level intermediate the ends of said passageway defining a gas plenum chamber between said partitioning and said first named partition, the annular passageway opening on its upper end into said plenum chamber, a conical drain funnel positioned at the lower end of said annular passageway adapted to receive the solid flow therefrom, said drain funnel having its spout positioned centrally below the annular passageway and extending through the bottom of said vessel, a plurality of conduits extending downwardly through said plenum chamber from a plurality of spaced locations on said partition to a plurality of locations spaced around the upper end of said annular passageway, said conduits extending through the partition on their open upper ends, a plurality of vertical, radial baffles across the upper portion only of said annular passageway dividing it into a plurality of vertical sections for solid flow, one section being provided to receive flow from each one of said conduits, said sections varying in horizontal cross-section in proportion to the amount of vessel cross-section controlled by the respective conduits delivering solid material thereto, the amount of vessel cross-section controlled by any conduit being dependent upon the tube spacing and being greater in areas where the tube spacing is greater, a plurality of baffles adapted to define a plurality of spaced gas collecting spaces from which direct gravity flow of solid material is excluded positioned in the lower section of said vessel above said first named partitioning, means defining a confined passageway for gas flow from each of said gas collecting spaces to the plenum chamber therebelow, a gas outlet connected into said vessel at the level of said plenum chamber and means to introduce a purge gas into the lower end of said annular passageway.

10. An apparatus for conducting reactions involving a fluid reactant in the presence of a moving granular contact material comprising in combination: a vertical, elongated vessel closed on its ends; a solid material inlet conduit extending into the upper section of said vessel; means to introduce a fluid reactant into the upper section of said vessel; two vertically spaced apart horizontal partitions extending across the lower section of said vessel above its bottom so as to define a gas plenum chamber therebetween; means defining four vertical annular passages communicating said plenum chamber on their upper ends and terminating a short distance above the bottom of said vessel on their lower ends, said means comprising four sets of vertical tubes depending from the lower partition, each set being made up of two concentrically arranged tubes; a funnel shaped drain section positioned below each of said annular passages, each drain section comprising a spout which extends down through the bottom of said vessel from a point centrally below one of said annular passages, a conical intermediate portion connected to said spout and a cylindrical upper portion of larger diameter than the outer tube forming the annular passage, said cylindrical upper portion extending concentrically up beyond the lower end of the drain passage a short distance so as to define an annular space around the lower portion of the annular drain passage; a closure plate extending between the upper cylindrical portion of each drain section and the outer tube forming the annular passage which said cylindrical portion surrounds; a gas inlet conduit connecting separately into each drain section at the location of said annular space surrounding the lower end of the annular passage; a plurality of spaced, inverted gas collecting troughs positioned in the lower section of said vessel above the upper partition, tubes extending upwardly from said plenum chamber and communicating the undersides of said troughs and a gas outlet conduit connected into said vessel at the level of said plenum chamber, a plurality of spaced holes distributed over the upper partition, a plurality of conduits, one for each hole, having their upper ends fitted tightly into said holes and extending downwardly from said upper partition, all of the conduits from each quadrant of said partition terminating at locations spaced around the upper section of one of said annular passages, transverse baffles across the upper portion of each annular passage and terminating substantially short of the lower end of said passages, said baffles dividing the upper portion of each annular passage into a plurality of vertical sections for solid flow, equal in number to said conduits so that only one of said conduits terminates in the upper section of each one of said vertical sections, said sections having their horizontal cross-sections proportioned directly to the relative amounts of vessel cross-section controlled by the respective conduits delivering solid material thereto, the amount of chamber cross section controlled by any conduit being determined by the density of conduit area provided per unit of chamber area, and being greater in those areas where the density of tube area per unit of chamber area is smaller.

11. An apparatus according to claim 10 characterized by the further improvement of a circular plate positioned above each of said holes in the upper partition, the plates having a diameter greater than that of the holes therebelow but substantially less than the minimum distance between adjacent holes and the plates being positioned above the holes a sufficient distance so that lines drawn upwardly from the center of the holes at slopes of 45 degrees do not intersect the plates thereabove.

ERIC V. BERGSTROM.

No references cited.